(12) United States Patent
Frank et al.

(10) Patent No.: US 7,315,743 B1
(45) Date of Patent: Jan. 1, 2008

(54) METHOD AND APPARATUS FOR SITE, FREQUENCY, AND BACKHAUL PLANNING FOR ACCESS POINTS

(75) Inventors: Colin D. Frank, Park Ridge, IL (US); Emanuel Kahana, Chicago, IL (US); Ron Rotstein, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 264 days.

(21) Appl. No.: 11/107,465

(22) Filed: Apr. 15, 2005

Related U.S. Application Data

(60) Provisional application No. 60/632,596, filed on Dec. 2, 2004.

(51) Int. Cl.
*H04Q 7/20* (2006.01)

(52) U.S. Cl. ........................ 455/446; 455/447

(58) Field of Classification Search ........ 455/446–449, 455/422.1; 703/13, 22
See application file for complete search history.

(56) References Cited

U.S. PATENT DOCUMENTS 5,603,083 A * 2/1997 Lee .......................... 455/561

* cited by examiner

*Primary Examiner*—Duc M. Nguyen
*Assistant Examiner*—Anthony S. Addy
(74) *Attorney, Agent, or Firm*—Randi L. Karpinia

(57) ABSTRACT

Site, frequency, and backhaul planning for access points is disclosed where the placement of coverage access points in an urban area requires taking a section of a grid of size 2K by 2K blocks where K is a range of a coverage access point and placing a first coverage access point at a first intersection within the grid wherein the first intersection is defined by a first street and a second street. Removing the first street and the second street from the list and placing a second coverage access point at a second intersection considering the streets in the list. Iterating through the streets in the list until each street has a coverage access point. Further disclosed is frequency planning for the site and backhaul planning for the site.

20 Claims, 14 Drawing Sheets

RANGE K=3, NUMBER OF CHANNELS=4

1114 — REFER TO THE SET OF K INTERSECTIONS CORRESPONDING TO LOCATION OF THESE FIRST SET OF K SECOND-TIER BACKHAUL AP'S AS THE BASE SET. FOR EVERY INTERSECTION IN THIS BASE SET, PLACE SECOND-TIER BACKHAUL AP'S AT EVERY INTERSECTION ON THE GRID FOR WHICH SEPARATION FROM THE BASE INTERSECTION CAN BE REPRESENTED AS EITHER 4K I BLOCKS VERTICAL AND 4KJ BLOCKS HORIZONTAL, OR AS 4K I + 2K BLOCKS VERTICAL, 4K J +2K BLOCKS HORIZONTAL FOR SOME INTEGER PAIR (I,J)

1116 — THE SECOND-TIER BACKHAUL AP'S PROVIDE BACKHAUL TO THE COVERAGE AP'S FOR WHICH THEY ARE THE NEAREST SECOND-TIER BACKHAUL AP. ALL COVERAGE AP'S ARE NO MORE THAN 2K-1 BLOCKS FROM A SECOND-TIER BACKHAUL AP.

*FIG. 11B*

1202 — BEGIN WITH THE BASE SET OF K INTERSECTIONS DEFINED IN PART 1 OF THE ALGORITHM. THIS BASE SET OF INTERSECTIONS ARE THE LOCATIONS OF THE FIRST K SECOND-TIER BACKHAUL AP'S PLACED IN PART 1.

1204 — PLACE A FIRST-TIER BACKHAUL AP AT EVERY INTERSECTION ON THE GRID THAT CAN BE REPRESENTED AS A SHIFT OF AN ELEMENT OF THE BASE SET, FOR SOME INTEGER PAIR(I,J), BY

8KI+2K BLOCKS VERTICALLY, 8 KJ BLOCKS HORIZONTALLY OR 8KI -2K BLOCKS VERTICALLY, 8 KJ+4K BLOCKS HORIZONTALLY

1206 — THE FIRST-TIER BACKHAUL AP'S PROVIDE BACKHAUL TO THE SECOND-TIER BACKHAUL AP'S FOR WHICH THEY ARE THE NEAREST FIRST-TIER BACKHAUL AP. ALL SECOND-TIER BACKHAUL AP'S ARE THE 2K BLOCKS FROM A FIRST-TIER BACKHAUL AP.

*FIG. 12*

FIGURE14: EXAMPLE BACKHAUL LAYOUT FOR AN ARBITRARY EFFICIENT TILING OF COVERAGE AP'S ON THE GRID (RED NODES ARE SECOND TIER BACKHAUL AP'S; GREEN NODES ARE FIRST TIER BACKHAUL AP'S).

ly further constraints, preclude the existence of additional identical elements in the process, method, article, or apparatus that comprises the element.

METHOD AND APPARATUS FOR SITE, FREQUENCY, AND BACKHAUL PLANNING FOR ACCESS POINTS

FIELD OF THE INVENTION

The present invention relates generally to wireless communication systems and in particular to the field of urban planning in wireless communication systems.

BACKGROUND

Wireless Local Area Network (WLAN) systems are designed to recreate the high quality communications that is typically supplied in wired networks that use standard LAN protocols such as Ethernet. High quality communications include uninterrupted network connections, high throughput and reliable delivery of data. However maintaining such high quality communications in a WLAN is more difficult than in a wired network. The range and speed of wireless communications is often limited by, for example, interference and power limitations. Maintaining a high quality communications in a WLAN therefore requires vigilant attention to error detection and correction and also requires careful monitoring of the conditions of the wireless link.

Despite their limitations, WLANs are frequently preferred over wired LANs, primarily because the user terminals of a WLAN are portable. Such portability makes possible Wireless Vehicle Area Networks (WVANs) and many Wireless Personal Area Networks (WPANs). However WLANs are also popular for other reasons. For example, with WLANs it is easy to use "ad hoc" networks that can be quickly assembled and torn down, and WLANs also may be more economical when compared with the high cost of infrastructure wiring.

Because of these advantages, WLANs are a preferred type of system for implementation in a wide urban area, such as a metropolitan city. In such a setting, implementing a WLAN in an efficient manner requires considering a number of factors. For example, how many coverage access points are needed to cover the urban area, how many frequencies are needed for the capacity of the system, and how is the wireless backhaul implemented? The overall objective of implementing the WLAN system is to reduce system cost by minimizing the number of access points and the number of network connections required for providing the coverage access points connection to a wired network (generally known as "backhaul"). Considering the size of an urban area, such as a metropolitan city, having to take into consideration all of these factors is a difficult, time consuming, and computationally intensive task. Accordingly, there exists a need for a method and apparatus for site, frequency, and backhaul planning of access points.

BRIEF DESCRIPTION OF THE FIGURES

The present invention is illustrated by way of example and not limitation in the accompanying figures, in which like references indicate similar elements, and in which:

FIG. 12 is a flow chart for illustrating close placement of first-tier APs in accordance with some embodiments of the invention.

Figure 1:
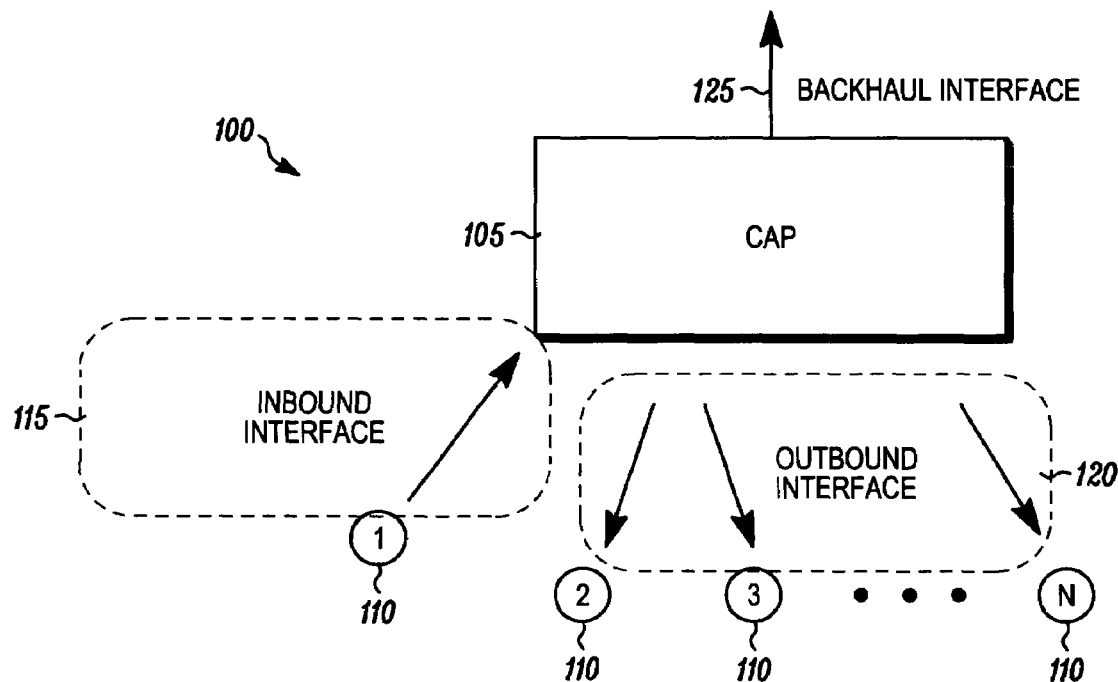
FIG. 1 is an example of a simple block diagram illustrating a WLAN in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail urban planning in accordance with an embodiment of the present invention, it should be observed that the present invention resides primarily in combinations of method steps and apparatus components related to urban planning. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

A method and apparatus for urban planning is disclosed. Referring to FIG. 1, there is a schematic diagram illustrating a WLAN 100 involving communications between a coverage access point (CAP) 105 and various mobile subscribers 110. In the WLAN 100 communications are classified as either inbound or outbound. The role of the CAP 105 is to relay inbound or outbound communications to and from mobile subscribers 110 and forward communications over the backhaul. In one embodiment, the communications adhere to an Open Systems Interconnection (OSI) level 2 spanning tree. As is known to one of ordinary skill in the art, OSI levels are well known and therefore will not be further described here.

For example, each mobile subscriber 110 could correspond to a member of an emergency response team and a dispatch call could be multicast from the CAP 105 to each emergency response team member. Further, IP packets sent across an outbound multicast interface 120 may have originated internally within the WLAN 100, or may have originated externally and were delivered to the CAP 105 across a backhaul interface 125. In an urban area, such as a metropolitan city, WLAN 100 is replicated many times to provide the entire area with wireless coverage.

Further, the WLAN may be an 802.11 wireless local area network (WLAN), wherein the mobile subscriber 106 and the CAP 105 are configured to operate in accordance with the ANSI/IEEE (American National Standards Institute/Institute of Electrical and Electronics Engineers) 802.11 wireless LAN standards. Alternatively, the packet data network 104 may adhere to another ANSI/IEEE 802 wireless standard, such as 802.15.1, 802.15.3, 802.15.4, 802.16, 802.20, 802.22, and the like. Further, the WLAN 100 may adhere to Global System for Mobile Communications (GSM) or other cellular standard. Thus, the mention of ANSI/IEEE 802.11 is not to be construed as a limitation.

Practitioners skilled in the art will appreciate that the communication system 100 may include various other communication devices not specifically shown in FIG. 1. For example, the backhaul interface 125 may comprise a link, such as, for example a T1 line or E1 digital carrier system that connects the WLAN 100 to a public switched telephone network (PSTN) via a telephone gateway, a paging network or short message system via a paging gateway, and a facsimile machine or similar device via fax gateway or modem.

In addition, the WLAN 100 may provide access to a number of content sources, such as the Internet or various Intranets. In support thereof, the packet data network 104 may include any number or type of wire line communication device(s), site controller(s), comparator(s), telephone interconnect device(s), internet protocol telephony device(s), call logger(s), scanner(s) and gateway(s), collectively referred to herein as a fixed device(s).

In any event, the endpoints of communication in the WLAN 100 are mobile subscribers 110. A mobile subscriber 110 is generally a communication device that may be either a source or recipient of payload and/or control messages routed through the WLAN 100. Mobile subscriber 110 may be any suitable type of wireless communications device capable of communicating within the WLAN 100, for instance, a laptop computer, a personal digital assistant, a voice handset, or any other suitable device as will be appreciated by those of skill in the art. The mobile device may also be connected to a fixed communications infrastructure, if desired.

Providing coverage to an urban area with WLAN-based systems using low mounting sites for the CAPs is greatly complicated by the fact that signal propagation between streets is often blocked by the ubiquitous presence of medium and high-rise buildings, and this problem is further aggravated if the system is operating in a frequency at a frequency band above a few GHz. To provide wireless coverage of an urban area, the placement of a number of CAPs 105 is important. In an. embodiment of the present invention, in general, placement of CAPs in an urban area covering a rectangular grid is performed by subdividing the grid into a smaller section of blocks, choosing a first intersection in the smaller section to place the first CAP, placing a second CAP at a second intersection considering the placement of the first CAP, and iterating through the remaining blocks in the grid until the urban area is covered by CAPs.

Figure 2:
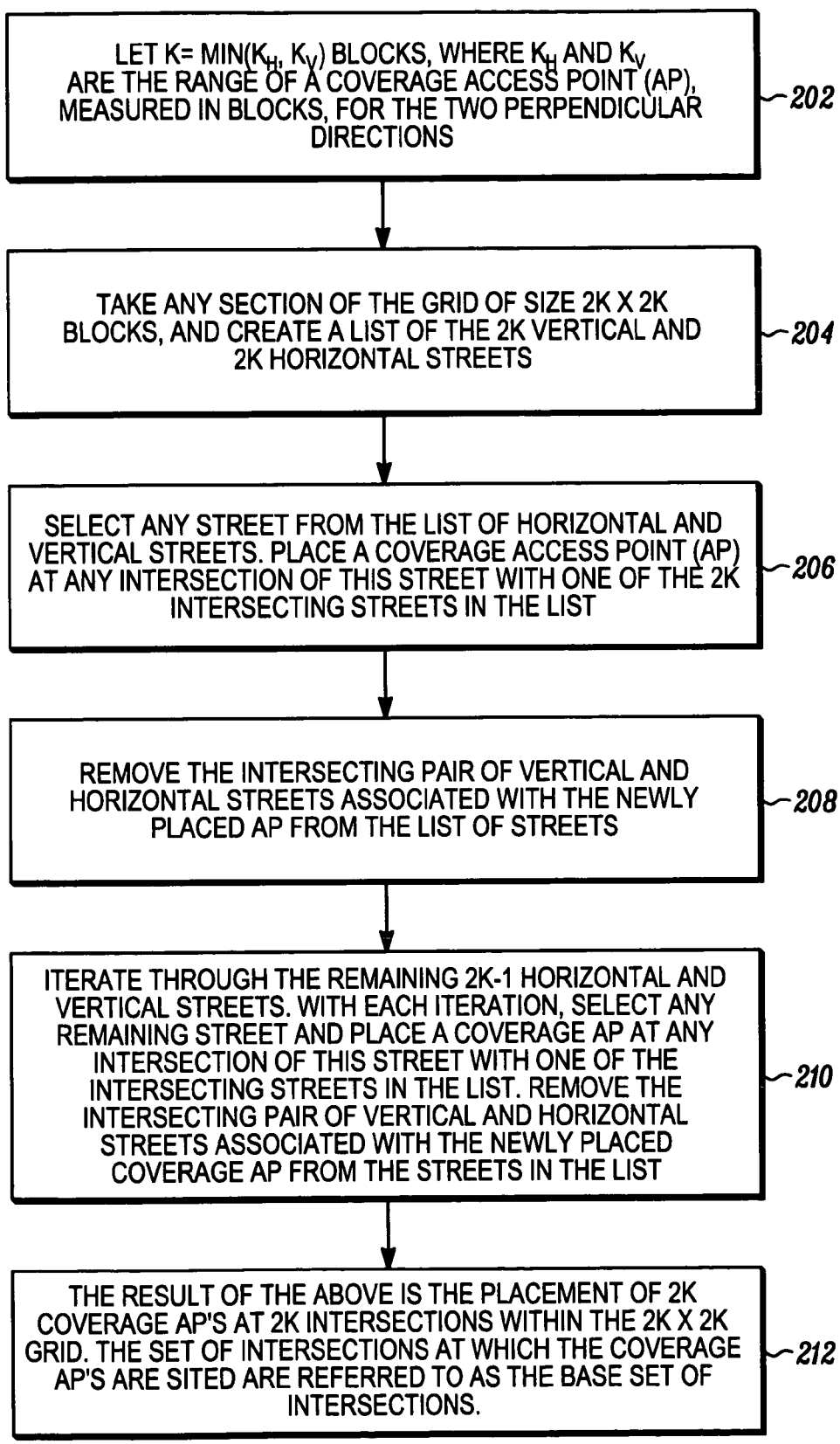
FIG. 2 is a flow chart for illustrating placement of CAPs in an urban area in accordance with some embodiments of the invention.

Referring to FIG. 2, shown is a flow chart illustrating the specifics relating to placement of CAPs in an urban area. For a single CAP having a range of coverage specified in meters, identify the number of street blocks of coverage in an urban area which corresponds to the range of coverage of the CAP (Block 202). Since it is not uncommon for street blocks in one direction to have a length that is unequal to the block length in the perpendicular direction (thus forming a rectangular, rather than square grid), the range of the CAP as measured in blocks will in general be unequal in the two directions. For this reason let $K_H$ and $K_V$ denote the range of coverage of the CAP in the horizontal and perpendicular directions, and let K denote the minimum of these two values, so that $K=\min(K_H,K_V)$ blocks.

Figure 3:
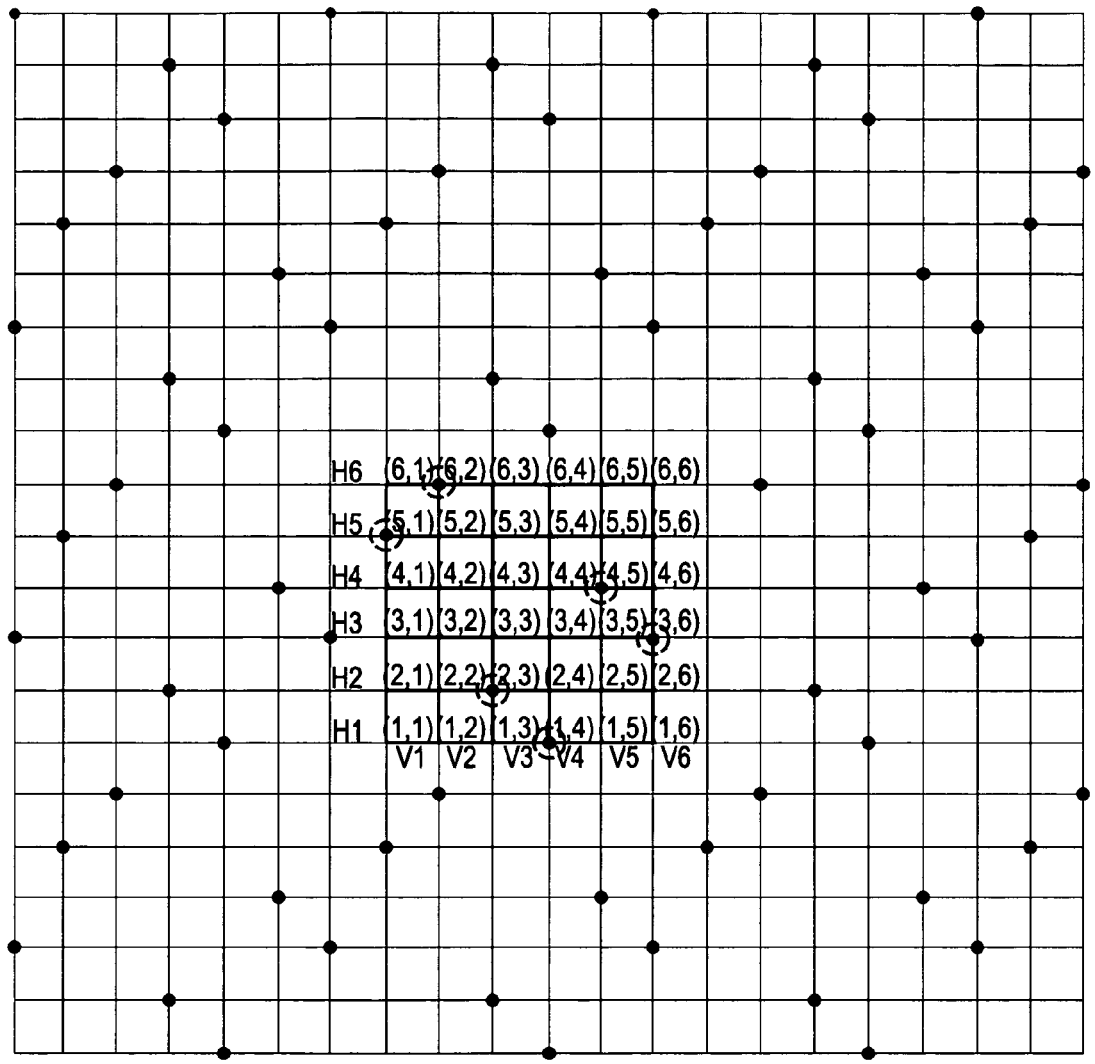
FIG. 3 is a grid illustrating an example placement of CAPs for FIG. 2 in accordance with some embodiments of the invention.

Take a smaller section of the urban area, corresponding to a grid size of 2K by 2K (Block 204) and create a list of all the vertical and horizontal streets intersections in the grid of size 2K×2K. For example, if the CAP has a range of 3 blocks, then K is equal to 3. Referring to FIG. 3, a list of all horizontal and vertical streets in the grid of size 6×6 contains H1, H2, H3, H4, H5, H6, V1, V2, V3, V4, V5, and V6. Then, select any street from the list of horizontal and vertical streets and place a CAP at any intersection of the selected street with one of the 2K intersecting streets in the list (Block 206). Continuing with the example where K=3 and referring to FIG. 3, picking a first street, H2, and choosing a vertical street, V3, yields placement of a first CAP at the intersection of H2 with V3, namely intersection (2,3). Then, remove the intersecting pair f vertical and horizontal streets associated with the CAP from the list of streets (block 208). Continuing with the example, remove H2 and V3 from the list of streets so that the list of streets now contains H1, H3, H4, H5, H6, V1, V2, V4, V5, and V6. Then, iterate through the remaining 2K−1 horizontal and vertical streets. With each iteration, select a remaining street and place a CAP at any intersection of this street with one of the intersecting streets on the list and remove the intersecting pair of vertical and horizontal streets associated with the newly placed CAP from the streets in the list (Block 210). The result of the iteration is the placement of 2K CAPs at 2K intersections to provide wireless access to the mobile subscribers within the 2K×2K grid of the urban area (Block 212).

Continuing with the example and referring to FIG. 3, pick a next street, say H4, and the intersection of this street with V5. The resulting intersection is (4,5). Place a CAP at (4,5) and remove H4 and V5 from the list of streets so that the list of streets now contains H1, H3, H5, H6, V1, V2, V4, and V6. Pick a next street, say V2, and the intersection of this street with H6. The resulting intersection is (6,2). Place a CAP at (6,2) and remove V2 and H6 from the list of streets so that the list of streets now contains H1, H3, H5, V1, V4, and V6. Continue in this manner to get a final set of CAPs as shown in FIG. 3 at intersections (1,4), (3,6), and (5,1). For the example of FIG. 3, CAPs are placed at (2, 3), (4, 5), (6, 2), (1, 4), (3, 6), and (5, 1) to provide coverage of the 6×6 block grid.

As is known to one of skill in the art, the above steps can be repeated across the urban area by partitioning the urban area into a non-overlapping covering of 2K×2K grids that are translations of the initial 2K×2K grid. The CAP layout defined in the initial 2K×2K grid is then duplicated in each of the 2K×2K grids covering the area. For example, performing the above process for each grid area and then moving to a contiguous area will provide coverage to a metropolitan city.

Figure 4:
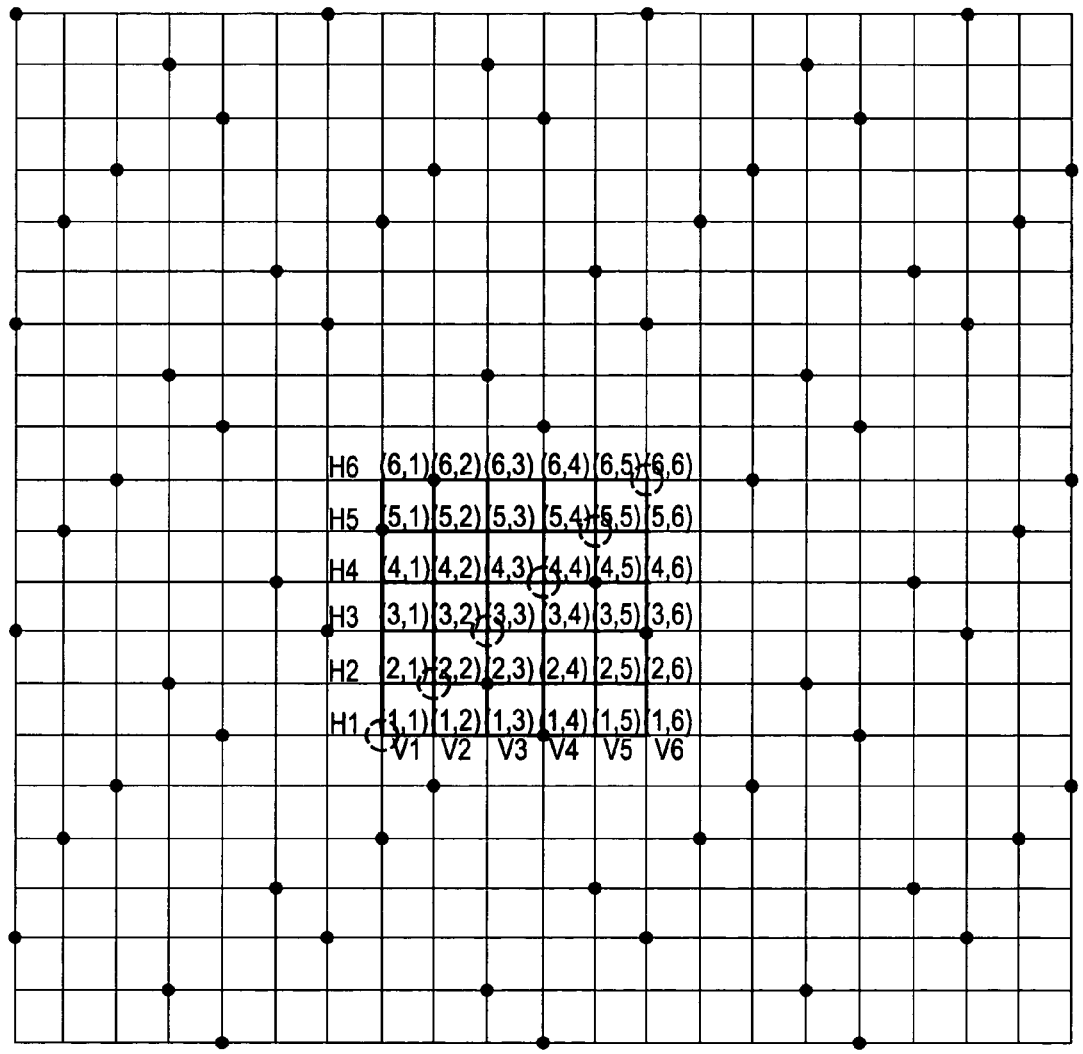
FIG. 4 is grid illustrating an example placement of CAPs for a diagonal layout in accordance with some embodiments of the invention.

Using the above algorithm, an alternative layout where CAPs are placed at intersections lying on a diagonal of the 2K×2K grid may be obtained. Such a layout is termed a diagonal layout. Just as described above, the diagonal layout minimizes the number of CAPs needed for the 2K×2K grid in that only 2K CAPs are needed to provide coverage of the 2K×2K grid. CAPs are placed at intersections lying on diagonals that are separated by 2K blocks, as measured in horizontal or vertical blocks. Here K is defined as min ($K_H$, $K_V$), where $K_H$ and $K_V$ denote the range of the CAP as measured in horizontal and vertical blocks respectively. Note that there are two possible and equally efficient diagonal layouts—the first referred to as the "right diagonal" with diagonals that go up and to the right, and the second referred to as the "left diagonal" with diagonals that go down and to the right. Shown in FIG. 4 is an example right diagonal layout for K=3 with CAPs placed at intersections (1,1), (2,2), (3,3), (4,4), (5,5), and (6,6).

Irrespective of the layout obtained by using the steps of FIG. 2, an efficient CAP layout is obtained that satisfies the criteria of minimizing the number of CAPs required to provide coverage of a 2K×2K grid is obtained.

Having obtained an efficient CAP layout for the 2K×2K grid, a frequency plan for the CAPs is important. The frequency plan must take into consideration factors such as where CAPs are located and the spectrum available to the CAPs in the network. In addition, it is important not to assign adjacent CAPs the same frequency channel where two CAPs are considered adjacent if they lie on the same street and there is no CAP between them. Having adjacent CAPs use the same frequency channel causes a number of problems including both increased co-channel interference and increased contention for the channel due to access collisions.

Figure 5:
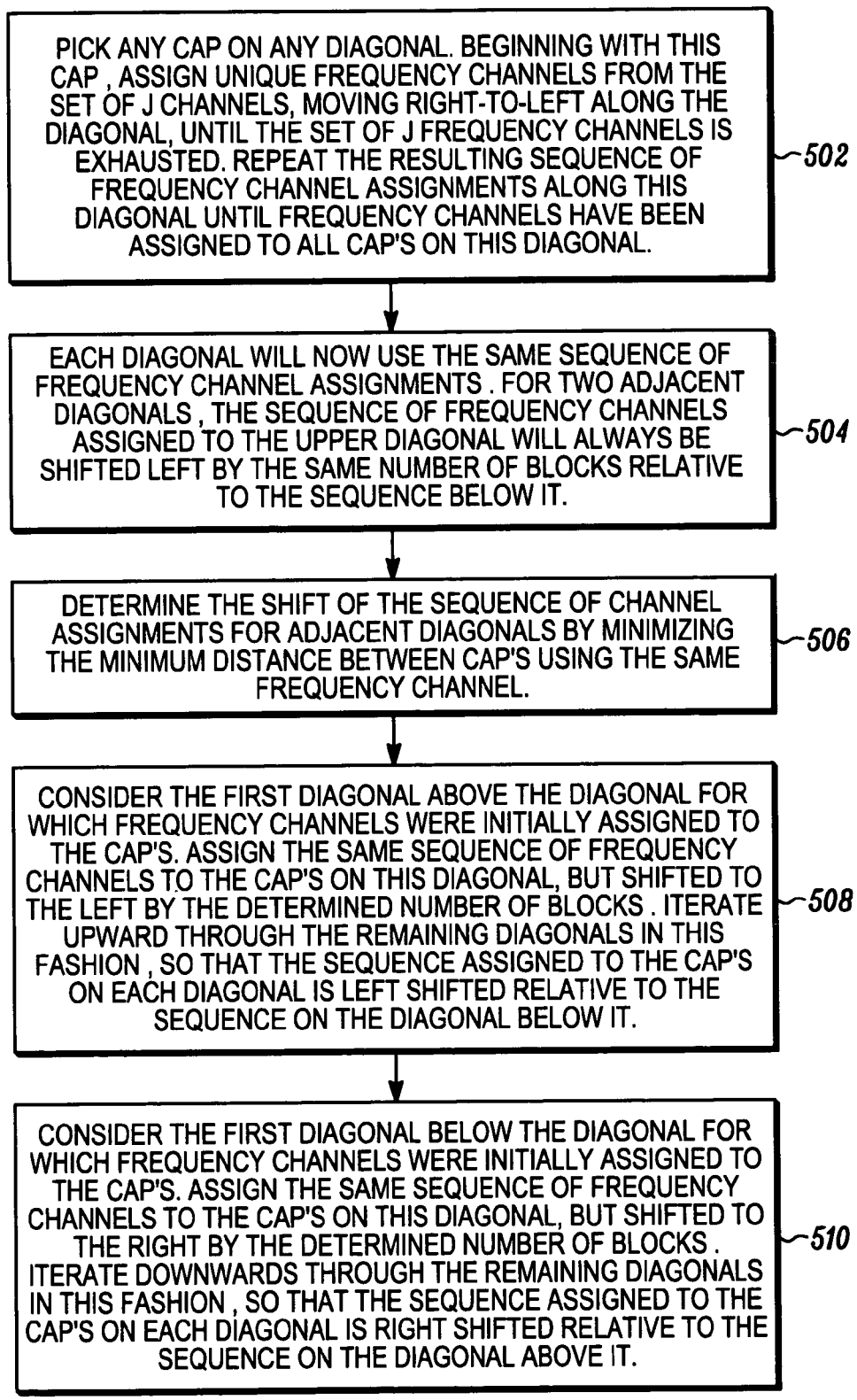
FIG. 5 is a flow chart for illustrating frequency planning for CAPs in a diagonal layout in accordance with some embodiments of the invention.

Referring to FIG. 5, shown is a flow chart illustrating the specifics relating to frequency planning of CAPs in an urban area assuming the availability of J frequency channels. For ease of illustration, a diagonal layout of CAPs is assumed in the below example. However, disclosed below is a general algorithm defining a frequency plan for any efficient CAP layout, e.g. as derived using the algorithm described in FIG. 2. Beginning with any given diagonal, and any given CAP on the diagonal, unique frequency channels from the set of J frequency channels are assigned to the CAPs, moving right-to-left along the diagonal, until the set of J frequency channels is exhausted. The resulting sequence of frequency channel assignments is then repeated periodically along this diagonal until frequency channels have been assigned to all CAPs on this diagonal (Block 502).

Continuing, all diagonals then re-use the periodic sequence of channel assignments just defined on the first diagonal, except that the sequence on each successive diagonal is shifted in order to minimize some measure of co-channel interference. Moving upwards on the grid from one diagonal to the next, each successive diagonal will re-use the same sequence of channel assignments, but in each case, the sequence on a given diagonal will be shifted left by the same number of blocks relative to the diagonal beneath it (Block 504).

Continuing, assigning channel assignments may require shifting the sequence of channel assignments for adjacent diagonals. In an embodiment of the present invention, the step of shifting is performed by considering the measurement of co-channel interference. Co-channel interference is minimized by i) maximizing the minimum distance between CAPs having the same frequency assignment and ii) maximizing over all intersections the minimum ratio of the distance from a given intersection to its serving CAP to the distance to a nearest second CAP using the same frequency channel as the serving CAP (Block 506). For a diagonal layout, maximizing the minimum distance between CAPs having the same frequency assignment (i) is equivalent to maximizing over all intersections the minimum ratio of the distance from a given intersection to a serving CAP to the distance to a nearest second CAP using the same frequency channel as the serving CAP (ii).

There may be one or more possible shifts of the sequence of channel assignments on adjacent diagonals that will maximize the distance between CAPs using the same frequency (thus satisfying criteria (i) and (ii) above). For "right diagonal" CAP layouts, it can be shown that if J frequency channels are available, where K+1<J<2K, an optimal left shift of the periodic sequence for the diagonal above the reference diagonal is K−J/2, for J even, and K−(J±1)/2 for J odd. It follows that for "left diagonal" CAP layouts, an optimal right shift of the periodic sequence for the diagonal above the reference diagonal is K−J/2, for J even, and K−(J±1)/2 for J odd. In both of these cases, the minimum distance for frequency re-use on the diagonal is J$\sqrt{2}$ and the min distance for frequency re-use between diagonals is no less than $\sqrt{2K^2+J^2}/2$ (Block 506).

In order to minimize co-channel interference further, it is also desirable to ensure, if possible, that at every intersection, at least one of the nearest CAPs is assigned a frequency channel that is distinct from the frequency channels assigned to the all other CAPs at the same distance from the intersection. Note that on a square or rectangular grid, there can be one, two, three or four nearest CAPs. It can be shown that the frequency plans defined above for diagonal CAP layouts have this property so long as J≧K+1.

Having determined a shift of the sequence of channel assignments, then assignment of frequency channels to the CAPs in the grid above (Block 508) and below (Block 510) the initially assigned CAPs is performed. Consider the first diagonal above the diagonal for which frequency channels were initially assigned to the CAPs. Assign the same sequence of frequency channels to the CAPs on this diagonal, but shifted to the left by the determined number of blocks. Iterate upward through the remaining diagonals in this fashion, so that the sequence assigned to the CAPs on each diagonal is left shifted relative to the sequence on the diagonal below it (Block 508). Consider the first diagonal below the diagonal for which frequency channels were initially assigned to the CAPs. Assign the same sequence of frequency channels to the CAPs on this diagonal, but shifted to the right by the determined number of blocks. Iterate downwards through the remaining diagonals in this fashion, so that the sequence assigned to the CAPs on each diagonal is right shifted relative to the sequence on the diagonal above it (Block 510).

Figure 6:
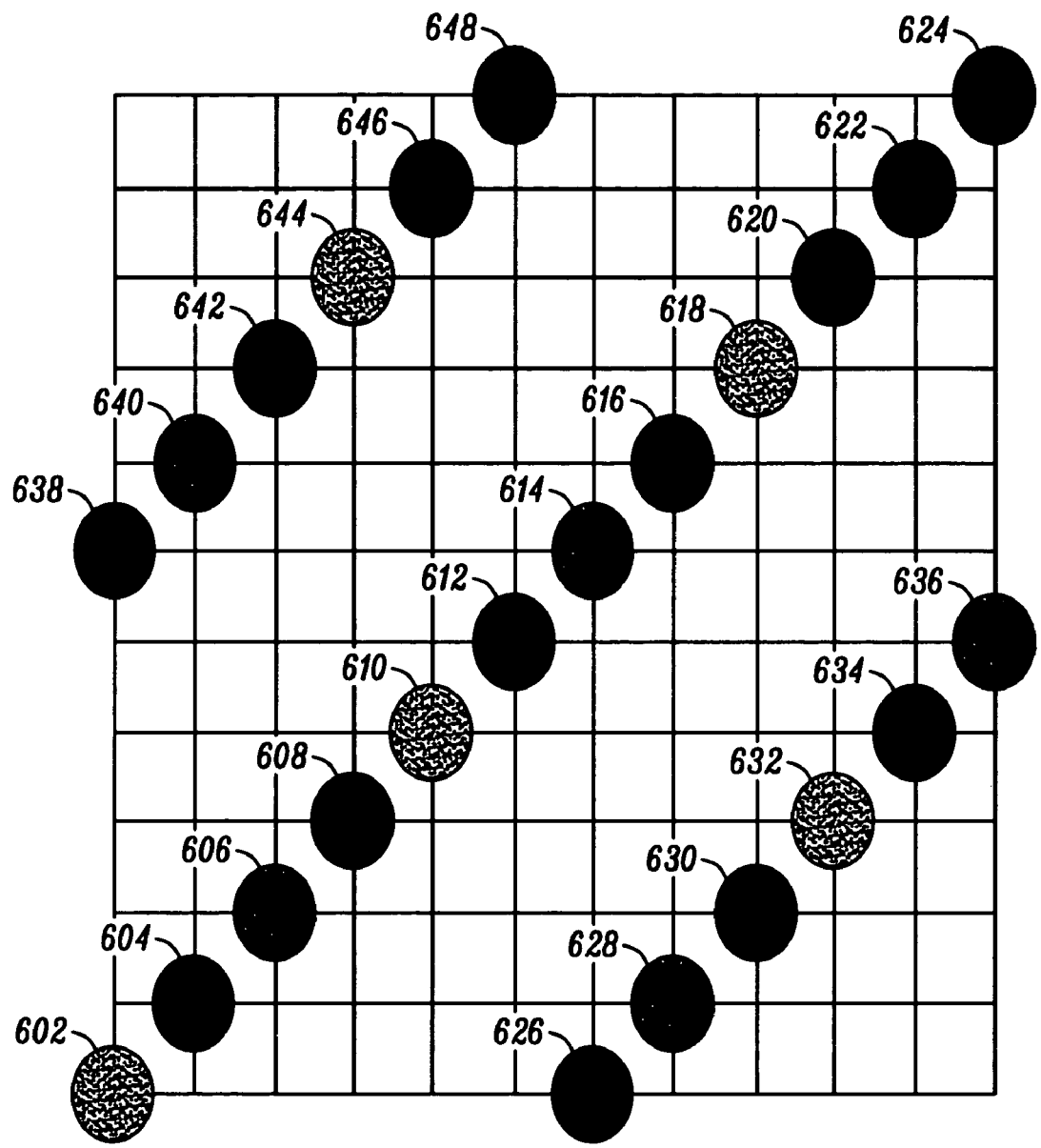
FIG. 6 is a grid illustrating an example frequency plan for FIG. 5 in accordance with some embodiments of the invention.

Shown in FIG. 6 is an illustration of an example frequency plan for an urban grid for CAPs having a range of coverage of three blocks and an available spectrum of four channels. Thus, shown is a frequency plan for K=3 and J=4. Following the steps for frequency planning outlined in FIG. 6, CAP 602 is assigned the first frequency channel, say $f_c=1$. From there, each CAP on the diagonal is assigned unique frequency channels until the set of J frequency channels is exhausted and then the sequence is repeated. Thus, frequency channels are assigned as follows (Block 502):

CAP 602 is assigned $f_c=1$
CAP 604 is assigned $f_c=2$
CAP 606 is assigned $f_c=3$
CAP 608 is assigned $f_c=4$
CAP 610 is assigned $f_c=1$
CAP 612 is assigned $f_c=2$ Continuing, adjacent diagonals will be assigned the same sequence of frequency channel assignments as the above mapping, but will be shifted by a determined amount. In this case, the determined amount is a left shift of 1 block which is determined by the relationship of K−J/2 (Block 506). Continuing, the other CAPs in the urban grid are similarly assigned as follows (Blocks 508, 510):

CAP 614 is assigned $f_c$ = 3
CAP 616 is assigned $f_c$ = 4
CAP 618 is assigned $f_c$ = 1
CAP 620 is assigned $f_c$ = 2
CAP 622 is assigned $f_c$ = 3
CAP 624 is assigned $f_c$ = 4
CAP 626 is assigned $f_c$ = 2
CAP 628 is assigned $f_c$ = 3
CAP 630 is assigned $f_c$ = 4
CAP 632 is assigned $f_c$ = 1
CAP 634 is assigned $f_c$ = 2
CAP 636 is assigned $f_c$ = 3
CAP 638 is assigned $f_c$ = 2
CAP 640 is assigned $f_c$ = 3
CAP 642 is assigned $f_c$ = 4
CAP 644 is assigned $f_c$ = 1
CAP 646 is assigned $f_c$ = 2
CAP 648 is assigned $f_c$ = 3

As described above and as outlined in FIG. 2, there are many possible CAP layouts that can be deduced and the process for frequency planning outlined above and in FIG. 5 is specific to diagonal layouts. What follows is a description for generating frequency plans when the CAP layout is not diagonal.

Figure 7:
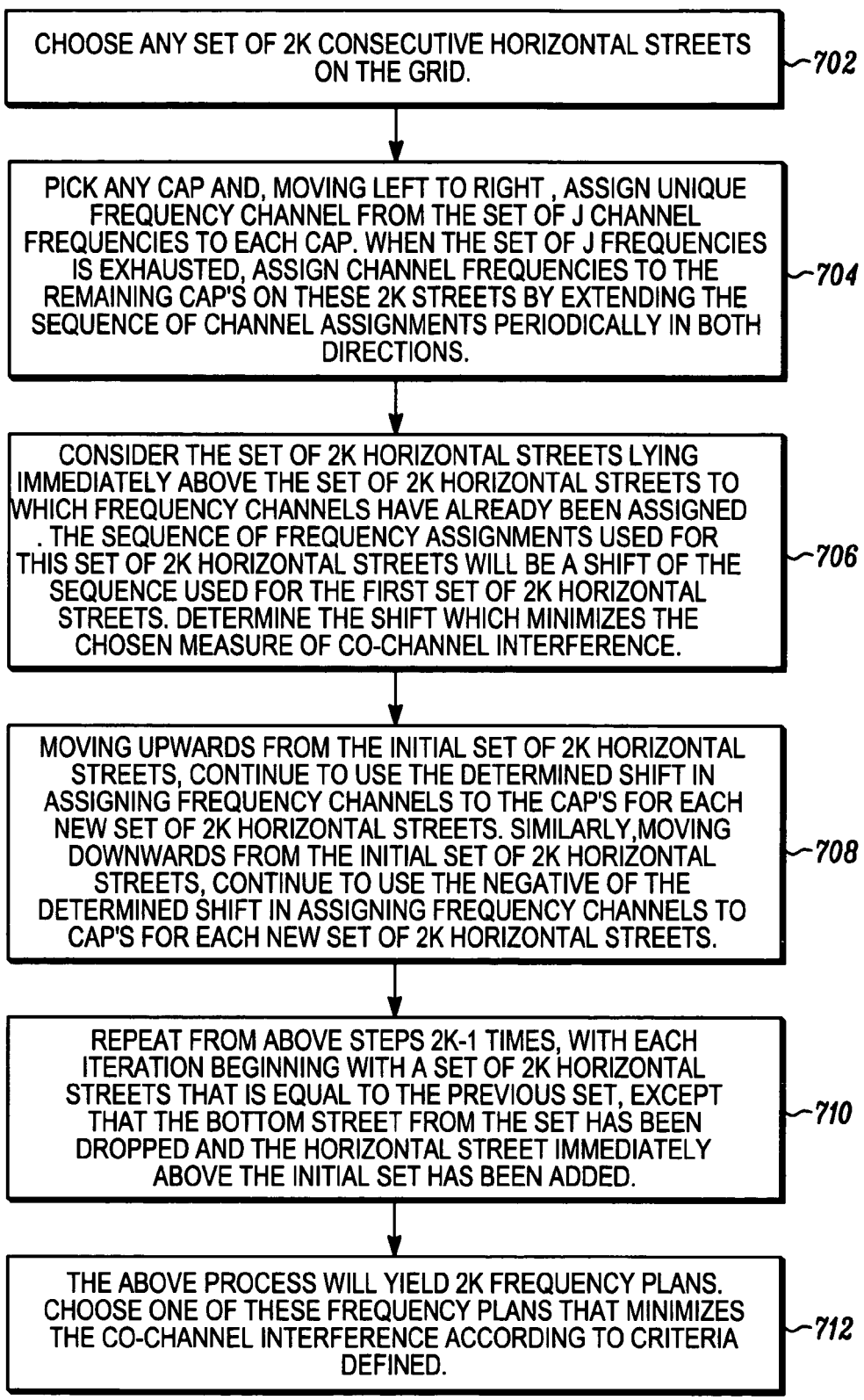
FIG. 7 is a flow chart for illustrating frequency planning for CAPs not in a diagonal layout in accordance with some embodiments of the invention.

As mentioned above, a grid of an urban area may be defined by 2K×2K blocks where K is defined as min ($K_H$, $K_V$), where $K_H$ and $K_V$ denote the range of the CAP as measured in horizontal and vertical blocks respectively. Referring to FIG. 7, shown is a flow chart illustrating the specifics relating to frequency planning of CAPs in an urban area assuming the availability of J frequency channels where J is not equal to 2K. Choose any set of 2K consecutive horizontal streets on the grid (Block 702). Pick any CAP and, moving left-to-right, assign a unique frequency channel from the set of J channel frequencies to each CAP. When the set of J frequencies is exhausted, assign channel frequencies to the remaining CAPs on these 2K horizontal streets by extending the sequence of channel assignments periodically in both directions (Block 704).

Consider the set of 2K horizontal streets lying immediately above and adjacent to the set of 2K horizontal streets to which APs have already been assigned. The sequence of frequency assignments used for this set of 2K horizontal streets will be a shift of the sequence used for the first set of 2K horizontal streets.

Determining the shift for this new set of 2K horizontal streets may be performed by considering several different factors (Block 706). To begin, we shift the sequence by an integer number of blocks, to the right or to the left, which is not an integer multiple of J. By not choosing an integer multiple of J, it is guaranteed that adjacent CAPs on the same street will not be assigned the same frequency. A first possibility is to shift by one block, to the right or the left. So long as J>K+1, shifting one block yields a frequency plan having the property that for any given intersection, at least one of the CAPs nearest to the intersection will have a frequency channel assignment that is distinct from any other CAP that is at the same distance from the intersection. Alternatively, it may be desirable to choose a shift that a) maximizes the minimum distance between any two CAPs that are assigned the same frequency and b) is an integer number of blocks, to the right or left, which is not an integer multiple of J (note that such a shift may have the property that every intersection has at least one nearest CAP that is assigned a frequency distinct from all other CAPs at the same distance, just as for the one block shift). Mathematically, for J frequencies, there are J−1 possible non-zero shifts. Further, the minimum distance can be evaluated by considering the CAPs on any set of 2K consecutive vertical streets in the lower 2K rows that is equal to LCM(2K, J), where this denotes the least common multiple of 2K and the number of frequencies J. For each of the J−1 possible shifts, determine the minimum frequency re-use distance between the set of 2K APs in the lower 2K rows of the LCM(2K,J) consecutive and the APs in the upper 2K rows. Choose the shift which maximizes the frequency re-use distance. Moving upwards from the initial set of 2K horizontal streets, continue to use this best shift for each new set of 2K horizontal streets. Similarly, moving downwards from the initial set of 2K horizontal streets, continue to use the negative of this shift for each new set of 2K horizontal streets (Block 708). An additional alternative would be to choose a shift for the upper set of 2K horizontal streets that minimizes a maximum ratio, taken over all intersections within the set of 4K horizontal streets, of the distance from the intersection to the serving CAP for that intersection and the distance from the intersection to any other CAP using the same frequency (note that such a shift may have the property that every intersection has at least one nearest AP that is assigned a frequency distinct from all other AP's at the same distance, just as for the one block shift). The maximum ratio may be evaluated as described above for maximizing the minimum distance between CAPs using the same frequency. A shift determined in this manner is then used for each block of 2K horizontal streets moving upward from the initial set of 2K horizontal streets, and the negative of this shift is used for each block of 2K horizontal streets moving downward (Block 708).

Continuing and referring to FIG. 7, Blocks 702-708 are repeated 2K−1 times, with each iteration using a set of 2K horizontal streets that is equal to the previous set, except that the bottom street from the set has been dropped and the horizontal street immediately above the initial set has been added (Block 710). Finally, 2K−1 possible frequency plans are determined and a choice of one frequency plan that minimizes co-channel interference according to the required factor should be chosen (Block 712).

Figure 8:
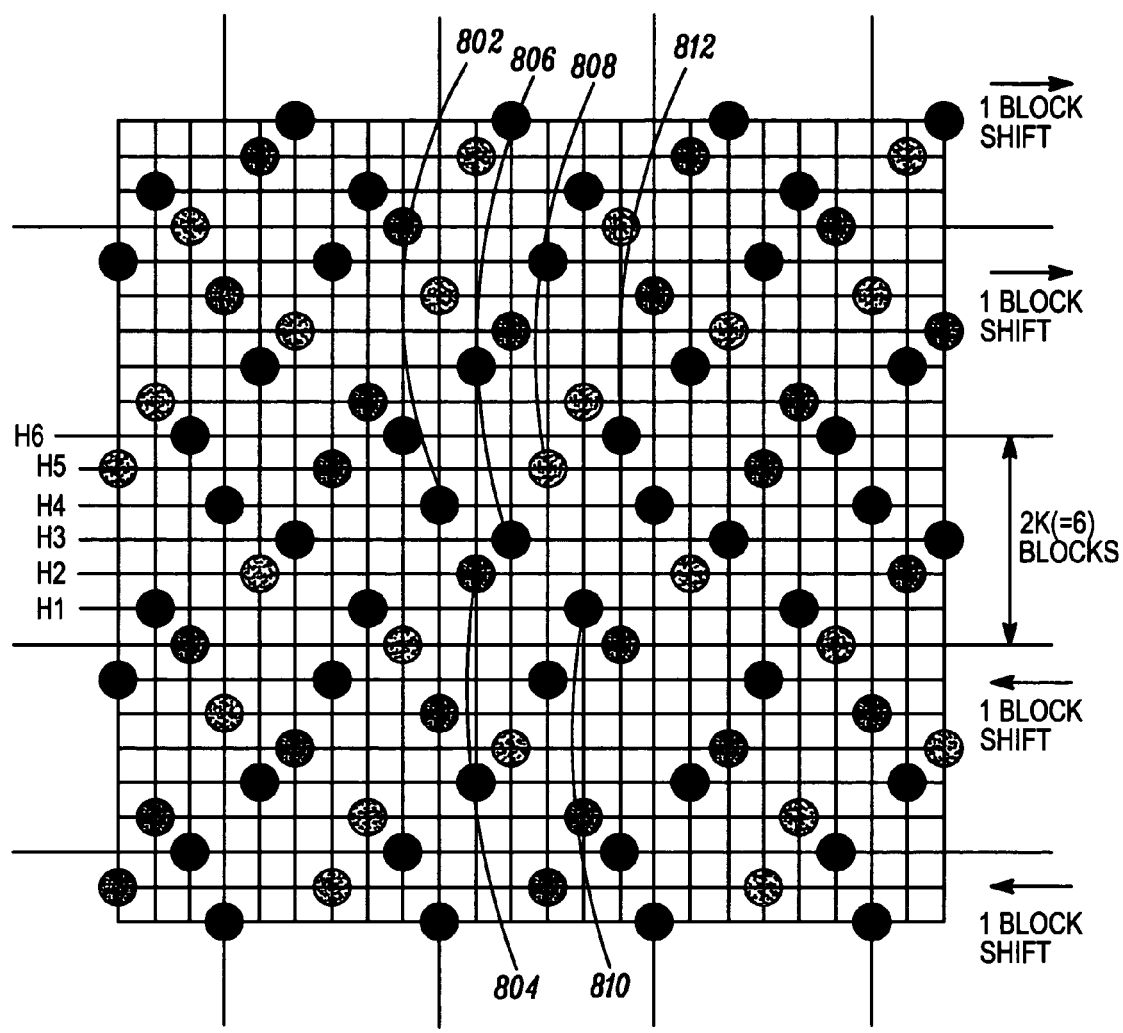
FIG. 8 is a grid illustrating an example frequency plan for FIG. 7 in accordance with some embodiments of the invention.

Shown in FIG. 8 is an illustration of an example frequency plan for an urban grid for CAPs having a range of coverage of three blocks and an available spectrum of four channels. Thus, shown is a frequency plan for K=3 and J=4. Following the steps for frequency planning outlined in FIG. 7, a set of 6 consecutive horizontal streets, namely H1, H2, H3, H4, H5, and H6, are chosen (Block 702). CAP 802 is assigned the first frequency channel, say J=1. From there, each adjacent CAP is assigned unique frequency channels until the set of J frequency channels is exhausted and then the sequence is repeated. Thus, frequency channels are assigned as follows (Block 704):

CAP 702 is assigned $f_c=1$
CAP 704 is assigned $f_c=2$
CAP 706 is assigned $f_c=3$
CAP 708 is assigned $f_c=4$
CAP 710 is assigned $f_c=1$
CAP 712 is assigned $f_c=2$ Continuing, the next set of 6 horizontal streets lying immediately above the set of 6 horizontal streets to which frequency channels have already been assigned is considered. The sequence of frequency assignments used for these 6 horizontal streets will be a shift of the sequence used for CAPs 702-712 (Block 706). In the example, the second factor is chosen and a shift of one block is chosen. Using the shift, the other CAPs are assigned frequency assignments iteratively until frequency planning for the urban area is completed (Blocks 708, 710).

Figure 9:
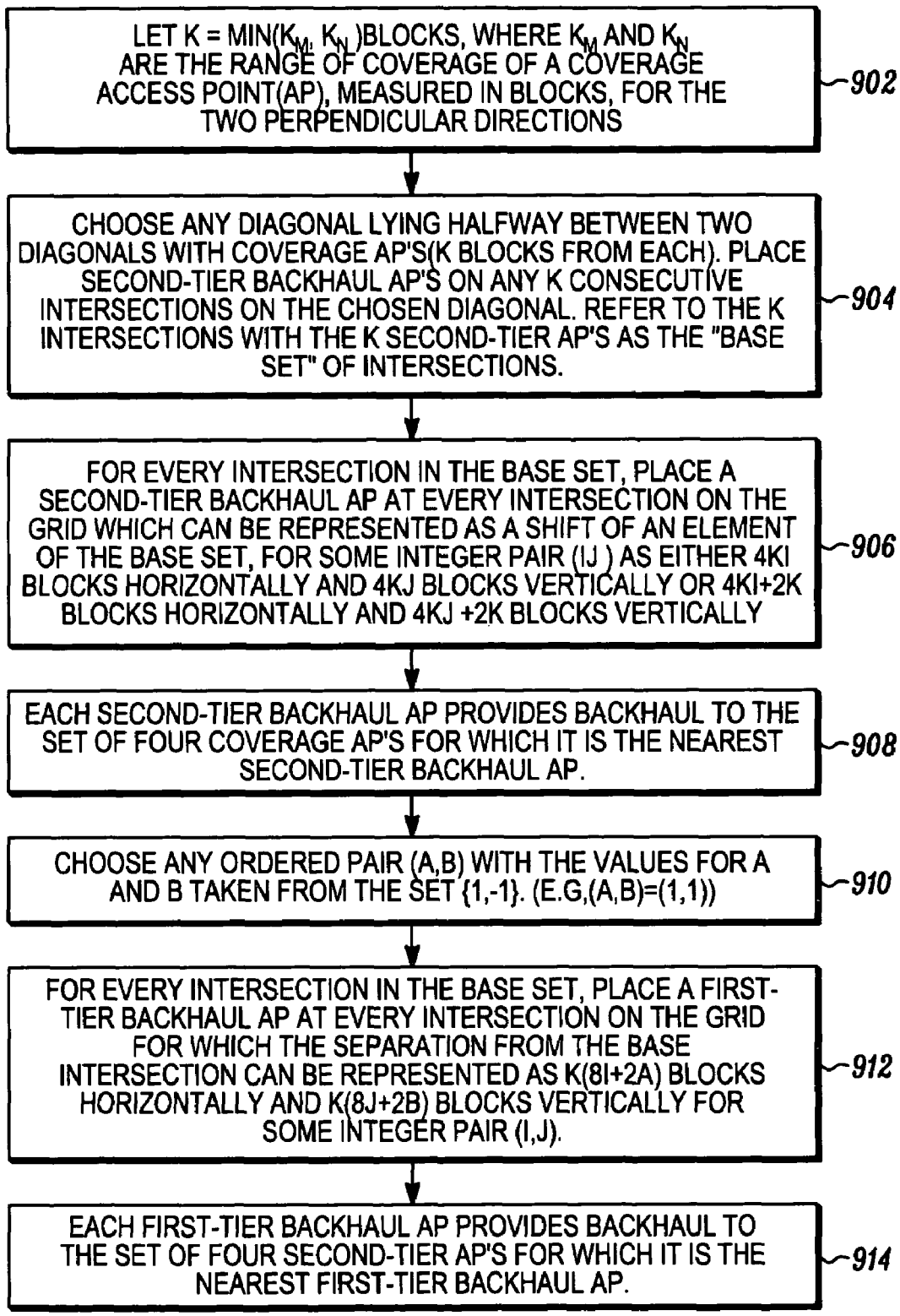
FIG. 9 is a flow chart for illustrating backhaul layout of APs in a diagonal layout in accordance with some embodiments of the invention.
Figure 10:
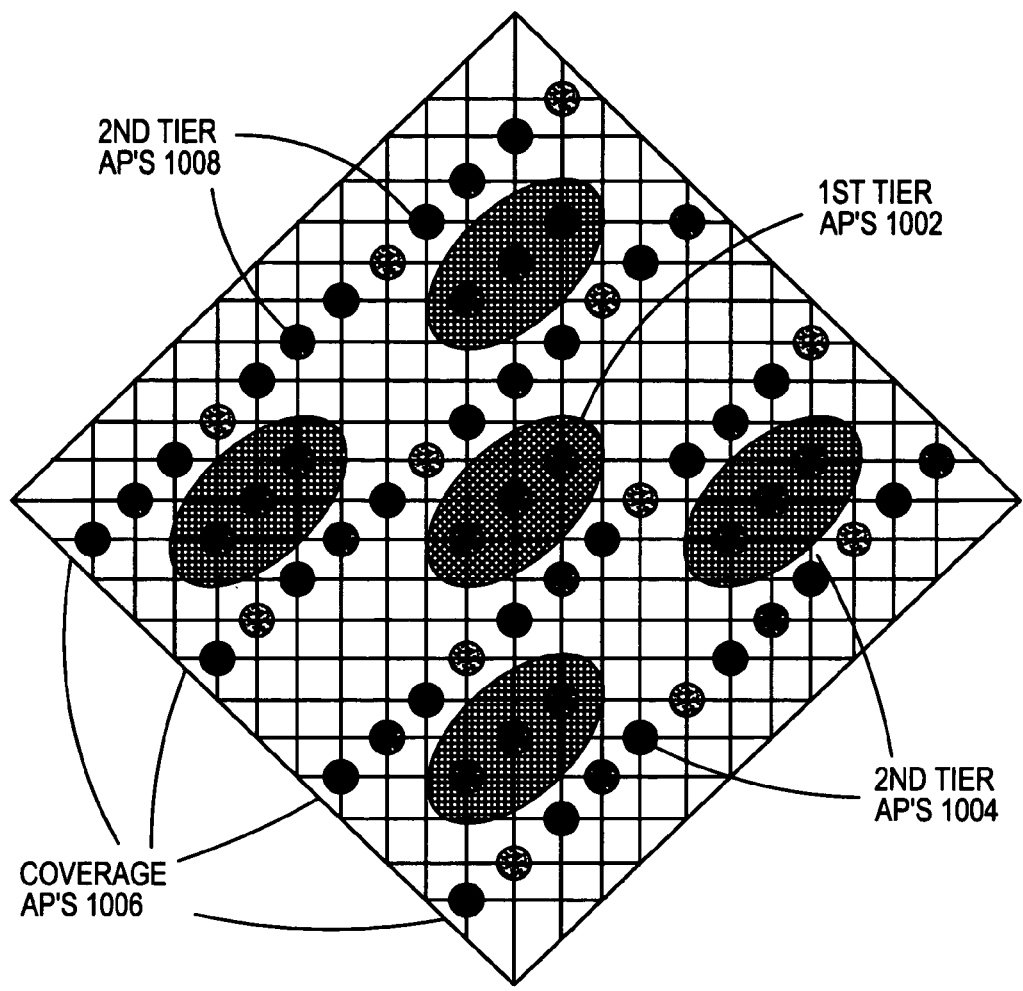
FIG. 10 is a grid illustrating an example backhaul layout for FIG. 9 in accordance with some embodiments of the invention.

Having obtained an efficient CAP layout for the 2K×2K grid, planning and layout of the backhaul is important. As mentioned above, for ease of illustration, a diagonal layout of CAPs is assumed. Shown in FIG. 9 is a flow chart illustrating the specifics relating to placement of APs where a diagonal layout of CAPs is assumed (Block 902) and FIG. 10 is an example layout of the backhaul. However any other efficient CAP layout may be used with the backhaul planning and layout described herewith. As shown in FIG. 10, place the second tier backhaul APs 1004, 1008 at intersections forming a diagonal where the second tier backhaul APs 1004, 1008 lie halfway in between the CAP diagonals 1006 (Block 904). This placement is referred to as a base set of intersections. For every intersection in the base set, place a second-tier AP at every intersection on the grid which can be represented as a shift of the form 4Ki blocks horizontally, 4Kj blocks vertically,
or, 4Ki+2K blocks horizontally, 4Kj+2K blocks vertically for some integer pair (i,j) (Block 906). Thus, each second-tier AP provides backhaul to a set of four CAPs for which the second-tier AP is nearest (Block 908). Choose any ordered pair (a, b) with values for a and b taken from the set {1, −1}. Thus, there are four possible ordered pairs, e.g. (a, b)=(1, 1), (1, −1), (−1, 1), (−1, −1) (Block 910). Then, place the first tier backhaul APs 1002 at intersections forming a diagonal where the first tier backhaul APs 1002 lay on alternate diagonals lying halfway between the second tier backhaul AP 1004, 1008 diagonals. Mathematically, for every intersection in the base set, place a first-tier AP at every intersection on the grid which can be represented as a shift of the base element by K(8I+2a) blocks horizontally and K(8j+2b) blocks vertically for some integer pair (i,j) (Block 912). Thus, the second tier backhaul AP 1004, 1008 diagonals are 4K blocks apart, and the first tier backhaul AP 1002 diagonals are 8K blocks apart. Finally, each first-tier AP provides backhaul to a set of four second-tier APs for which the first-tier AP is the nearest (Block 914).

Referring to FIG. 10, the second tier backhaul APs 1004, 1008 occur in blocks of K consecutive intersections along the diagonal that are alternated with blocks of K consecutive intersections without second tier backhaul APs. Note that the blocks of K second tier backhaul APs 1004 must be vertically aligned with blocks of K second tier backhaul APs 1008 on the other second tier access point diagonals. The first tier backhaul APs 1002 also occur in blocks of K consecutive intersections along the diagonal that alternate with 3K consecutive intersections without first tier backhaul APs. Note that the blocks of K consecutive intersections with first tier backhaul APs 1002 must align vertically with a block of K consecutive first tier backhaul APs above and below, and must also align vertically with the blocks of second tier backhaul APs 1004, 1008 above and below.

As can be calculated, for any K, a layout created by following the steps outlined in FIG. 9, this backhaul layout concentrates the backhaul by a factor of four on each hop, and thus reduces the number of APs requiring backhaul by a factor of 16. Moreover, the required number of network connections is reduced by 93.75%.

Figure 11A:
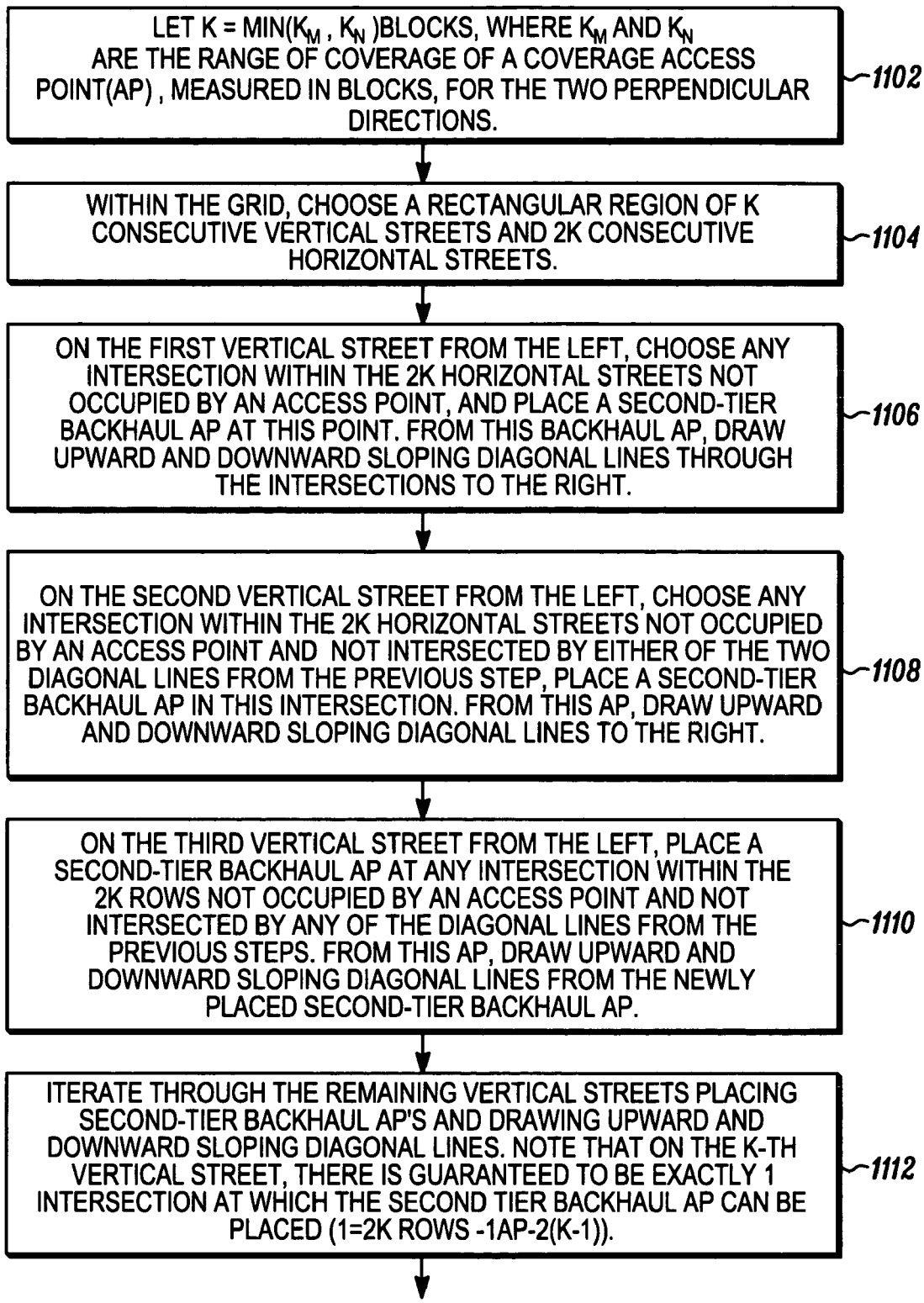
FIGS. 11A and B are a flow chart for illustrating backhaul layout of APs not in a diagonal layout in accordance with some embodiments of the invention.
Figure 14:
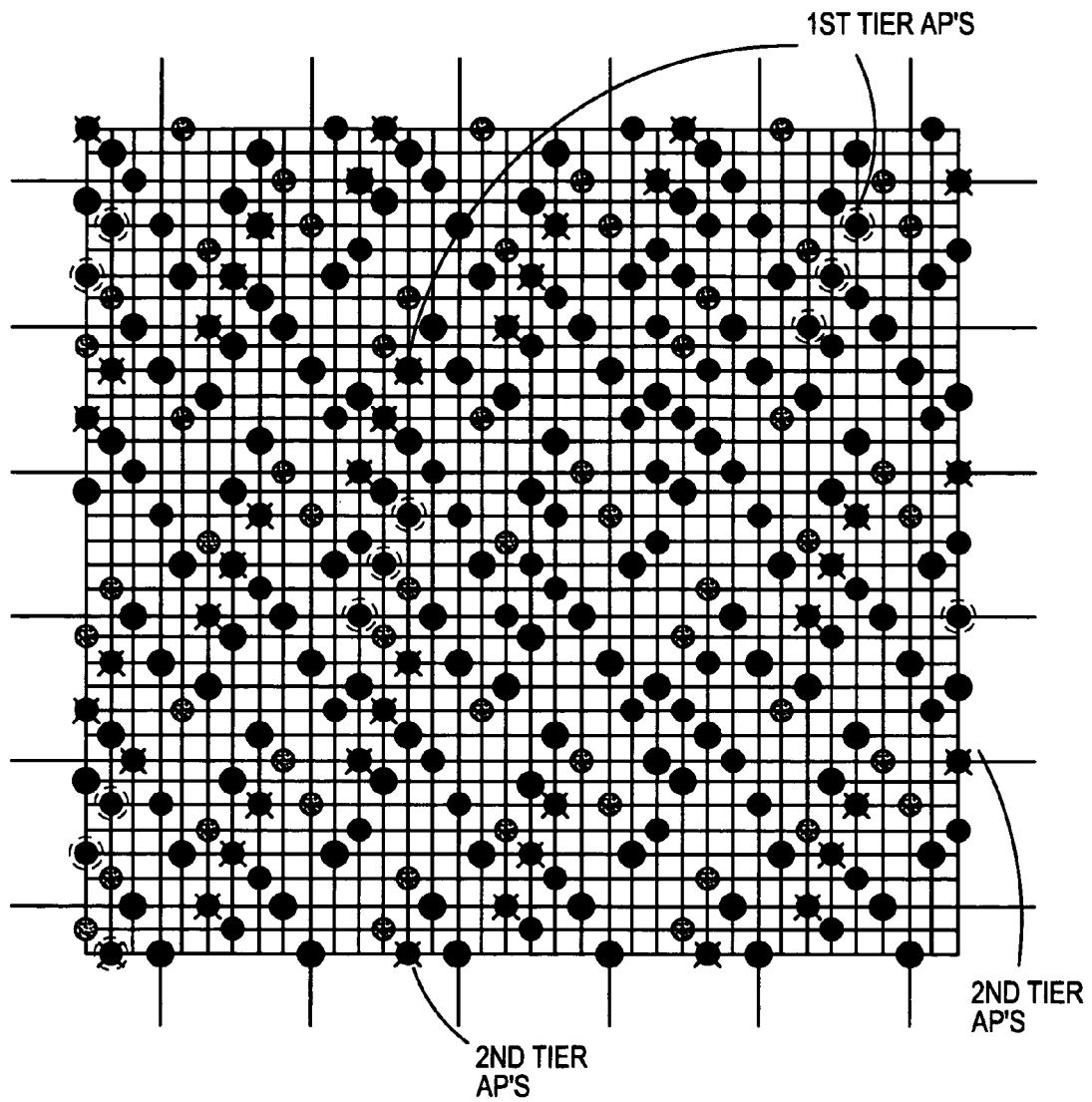
FIG. 14 is a grid illustrating an example backhaul layout for FIGS. 11A and B in accordance with some embodiments of the invention.

As described with respect to FIG. 2, there are many possible CAP layouts that can be deduced and the process of planning and layout of the backhaul for CAP layouts which are not diagonal follows. Shown in FIGS. 11A and B is a flow chart illustrating the specifics relating to placement of APs where a layout of CAPs which is not diagonal is assumed (Block 1102) and FIG. 14 is an example layout of the backhaul. As shown in FIG. 11, choose a rectangular region of K consecutive columns and 2K consecutive rows (Block 1104). On the first vertical street from the left, choose any intersection within the 2K rows not occupied by an access point, and place a second tier backhaul AP at this point. From this backhaul AP, draw diagonal lines at +/−45 degrees (Block 1106). Next, on the second vertical street from the left, choose any intersection within the 2K rows not occupied by an access point and not intersected by either of the two diagonal lines from the previous step, and place a second tier backhaul AP in this intersection. From this backhaul AP, draw diagonal lines at both +/−45 degrees (Block 1108). Next, on the third vertical street from the left, place a second tier backhaul AP at any intersection within the 2K rows not occupied by an access point and not intersected by any of the diagonal lines. From this backhaul AP, draw diagonal lines at +/−45 degrees (Block 1110). Then, iterate through the remaining vertical streets placing second-tier backhaul APs and drawing upward and downward sloping diagonal lines. Note that in the K-th column, there is guaranteed to be exactly one intersection at which the second tier backhaul AP can be placed (1=2K rows−1 AP−2(K−1)) (Block 1112). Continuing with FIG. 11B, refer to this set of K second tier backhaul APs as the base set, and place second tier backhaul Aps at all intersections that can be represented as a shift of an element of the base set by 4K i blocks vertically, and 4Kj blocks horizontally,
or, 4K i+2K blocks vertically, and 4Kj+2K horizontally for some integer pair (i,j). (Block 1114). Finally, the second tier APs provide backhaul for their nearest neighbors to the left, right, above, and below, and all of these neighbors are no more than 2K−1 blocks from the second tier backhaul AP, e.g. the sum of the left and right distances is 2K, as is the sum of the distances above and below (Block 1116).

As with the placement of the second tier backhaul APs, a variety of different placements can be used for the first tier backhaul APs. However, before this is done, a fundamental design choice must be made as to whether groups of first tier backhaul APs should be placed as near another as possible, or whether all first tier backhaul APs should be placed as far from each other as possible. The advantage of placing groups of first tier backhaul APs near each other is that this allows for the possibility of further backhaul aggregation prior to the network connection by connecting these sites via a wired link. However, such an arrangement may result in excessive co-channel interference because all of the backhaul APs use the same channel frequency. If the first tier backhaul APs are not going to be directly connected via a wired link, we would instead choose to space all of the first tier backhaul APs as far from each other as possible in order to minimize co-channel interference.

Based upon design choice, one of two algorithms may be followed for placement of the first tier APs. In a first embodiment, groups of K first tier backhaul APs are placed within a region no larger than 2K by K blocks. Referring to FIG. 12, begin with the base set of K intersections as defined for FIGS. 11A and B and are the locations of base set of K second-tier backhaul APs (Block 1202). Next, place first tier backhaul APs at all intersections that can be represented as a shift of an element of the base set of the of second tier backhaul APs by 8K i+2K blocks vertically, 8Kj blocks horizontally or 8Ki−2K blocks vertically, 8Kj+4K blocks horizontally
   for some integer pair (i, j).

In alternative embodiments, there are three other valid sets of shifts of the base set that can be used for placement of the first tier backhaul APs, and these are:

8Ki−2K blocks vertically, 8K j blocks horizontally, or, 8K i+2K blocks vertical, 8K j+4K blocks horizontally 8Ki blocks vertically, 8K j+2K blocks horizontally, or, 8Ki−4K blocks vertically, 8Kj−2K blocks horizontally 8Ki blocks vertically, 8Kj−2K blocks horizontally or, 8K i−4K blocks vertically, 8K j+2K blocks horizontally for some integer pair (i,j). Finally, the first tier APs provide backhaul for their second tier backhaul neighbors to the left, right, above, and below, and all of these neighbors are 2K blocks from the first tier backhaul AP (Block 1206).

Figure 13:
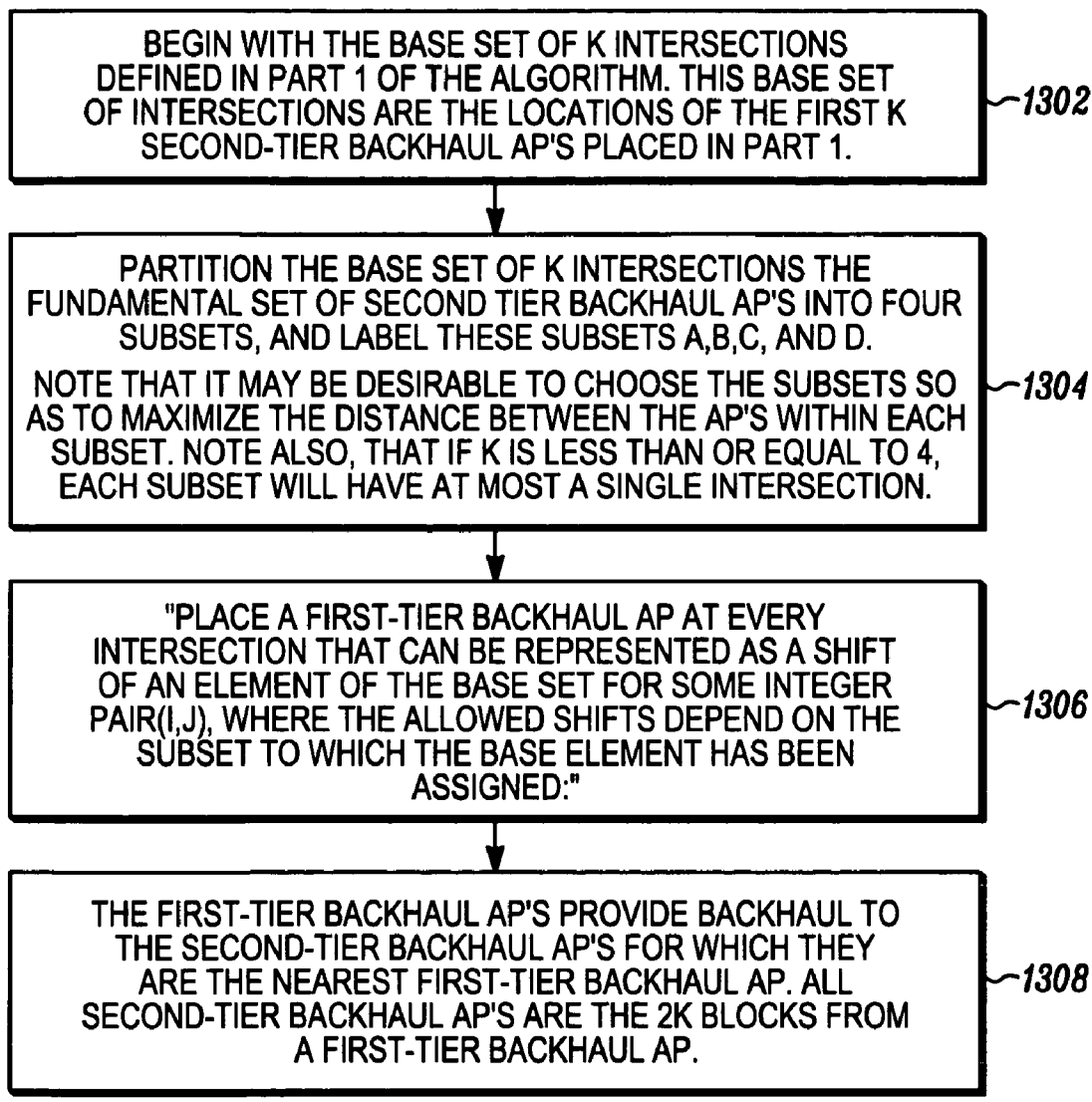
FIG. 13 is a flow chart for illustrating wide placement of first-tier APs in accordance with some embodiments of the invention.

In a second embodiment, the first tier backhaul APs as placed as far apart as possible. Referring to FIG. 13, begin with the base set of K intersections as defined for FIGS. 11A and B and are the locations of the first K second-tier backhaul APs (Block 1302). Then, partition the base set of second tier backhaul APs into four subsets, and label these subsets A, B, C, and D. Note that it may be desirable to choose the subsets so as to maximize the distance between the APs within each subset of the base set. Note also, that if K is less than or equal to 4, each subset will have only a single second tier AP (Block 1304). For each subset of the base set, place first-tier backhaul APs in all intersections that can be represented as an element of the base subset, as indicated below, for some integer pair (i, j) (Block 1306):

| subset A: | 8K i + 2K | vertically, 8K j | horizontally |
| | 8K i − 2K | vertically, 8K j + 4K | horizontally |
| subset B: | 8K i − 2K | vertically, 8K j | horizontally |
| | 8K i + 2K | vertically, 8K j + 4K | horizontally |
| subset C: | 8K i | vertically, 8K j + 2K | horizontally |
| | 8K i − 4K | vertically, 8K j − 2K | horizontally |
| subset D: | 8K i | vertically, 8K j − 2K | horizontally |
| | 8K i − 4K | vertically, 8K j + 2K | horizontally |

Finally, the second-tier APs provide backhaul for their second-tier backhaul neighbors to the left, right, above, and below, and these neighbors are 2K blocks from the first-tier backhaul AP (Block 1308). An example backhaul layout is shown in FIG. 14.

It will be appreciated that the urban planning described herein may be comprised of one or more conventional processors and unique stored program instructions that control the one or more processors to implement, in conjunction with certain non-processor circuits, some, most, or all of the functions of the synchronization described herein. The non-processor circuits may include, but are not limited to, a radio receiver, a radio transmitter, signal drivers, clock circuits, power source circuits, and user input devices. As such, these functions may be interpreted as steps of a method to perform synchronization. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for placement of coverage access points in an urban area comprising:
   partitioning the urban area into one or more non-overlapping grids;
   subdividing a grid of the plurality of non-overlapping grids into a plurality of sections;
   determining placement of coverage access points within a section of the grid comprising:

taking the section of the grid of size 2K by 2K blocks where K is a range of a coverage access point;

compiling a list of vertical and horizontal streets intersections in the grid wherein the list comprises at least a first street, a second street, a third street, and a fourth street;

placing a first coverage access point at a first intersection within the grid wherein the first intersection comprises the first street and the second street;

removing the first street and the second street from the list;

placing a second coverage access point at a second intersection considering the streets remaining in the list;

iterating through the streets in the list until each street comprises a coverage access point;

repeating the determining of placement of coverage access points for each of the plurality of sections of the grid; and repeating the steps of subdividing into a plurality of sections and the determining placement of coverage access points for each section of each of the plurality of non-overlapping grids within the urban area.

2. The method of claim 1 wherein the step of placing further comprises placing the second coverage access point at a second intersection which is at a position selected from a horizontal or a perpendicular location from the first coverage access point to yield a layout of coverage access points selected from a group of layouts comprising a vertical layout and a horizontal layout.

3. The method of claim 1 wherein the coverage access points adhere to an Open Systems Interconnection (OSI) level 2 spanning tree.

4. The method of claim 1 wherein the coverage access points are configured to operate in accordance with an American National Standards Institute/Institute of Electrical and Electronics Engineers 802.11 wireless LAN standard.

5. The method of claim 2 further comprising:
selecting a third coverage access point on the layout;
assigning a fourth coverage access point in the layout a frequency channel from a set of channels;
repeating the assignment to other coverage access points on the layout resulting in a sequence of frequency channels;
determining a shift of the sequence of frequency channels by maximizing a minimum distance between coverage access points using a same frequency channel;
assigning the shifted sequence of frequency channels to other coverage access points in other layouts in the urban area.

6. The method of claim 5 wherein the step of determining a shift is performed by considering several different factors wherein at least one factor is co-channel interference.

7. The method of claim 6 wherein co-channel interference is minimized by maximizing over all intersections a minimum ratio wherein the ratio is a first distance from one intersection to the intersection's coverage access point to a second distance from a second coverage access point that is nearest to the intersection's coverage access point, wherein the intersection's coverage access point and the second coverage access point have the same frequency assignment.

8. The method of claim 6 wherein the co-channel interference is minimized by assigning a frequency channel to the first coverage access point that is distinct from the frequency channels assigned to coverage access points that are nearest to the first coverage access point.

9. A method for placement of coverage access points in an urban area comprising:
taking a section of a grid of size 2K by 2K blocks where K is a range of a coverage access point;
compiling a list of streets in the grid wherein the list comprises at least a first street, a second street, a third street, and a fourth street;
placing a first coverage access point at a first intersection within the grid wherein the first intersection comprises the first street and the second street;
removing the first street and the second street from the list;
placing a second coverage access point at a second intersection considering the streets remaining in the list, wherein the second intersection is at a diagonal from the first coverage access point to yield a diagonal layout of coverage access points;
iterating through the streets in the list until each street comprises a coverage access point;
choosing any diagonal in the diagonal layout lying halfway between two diagonals with coverage access points;
placing a base set of K consecutive second-tier access points on the chosen diagonal;
placing second-tier access points at intersections that can be represented as a first shift of an element of the base set; and
placing first-tier access points at intersections that can be represented as a second shift of an element of the base set.

10. The method of claim 9 wherein the shift is represented mathematically by at least one of a) 4Ki blocks vertically and 4Kj blocks horizontally, for some integer pair (i, j) and b) 4Ki+2K blocks vertically and 4K+2K blocks horizontally, for some integer pair (i, j).

11. The method of claim 9 wherein the second shift is represented mathematically by K(8I+2a) blocks vertically and K(8j+2b) blocks horizontally, for some integer pair (i,j) wherein the integer pair (a,b) is chosen from the set comprising {(1, 1), (1, −1), (−1, 1), (−1, −1)}.

12. A method for frequency planning for coverage access points in an urban area comprising:
selecting a first coverage access point in a set of 2K consecutive horizontal streets in a grid of the urban area;
assigning a frequency channel to the first selected coverage access point, wherein the frequency channel is chosen from a list of frequencies, and subsequently comprising:
(i) moving sequentially across vertical streets in the grid,
(ii) assigning frequencies, without repetition, to each coverage access point within the set of 2K consecutive horizontal streets until the frequencies in the list are exhausted, and
(iii) resulting in a sequence of frequency channels;
extending the sequence of frequency channels periodically within the set of 2K consecutive horizontal streets;
determining a shift of the sequence of frequency channels for the set of 2K consecutive horizontal streets above and adjacent to the set of 2K consecutive horizontal streets, wherein the shift of the sequence of frequency channels maximizes a distance between one or more access points using the same frequency;
assigning the shifted sequence of frequency channels to coverage access points lying in the set of 2K consecutive horizontal streets above the set of 2K consecutive horizontal streets, and iteratively repeating this process moving up the grid; and assigning a shifted sequence of frequency channels to coverage access points lying in the set of 2K consecutive horizontal streets immediately below the set of 2K consecutive horizontal streets, and iteratively repeating this process moving down the grid.

13. The method of claim 12 wherein the step of moving comprises at least one of moving right-to-left and moving left-to-right.

14. The method of claim 12 wherein the step of determining a shift of the sequence of frequency channels further comprises minimizing a measure of co-channel interference.

15. The method of claim 14 wherein co-channel interference is minimized by at least one of a) maximizing a minimum distance between coverage access points having the same frequency assignment, and b) maximizing over all intersections a minimum ratio wherein the ratio is a first distance from one intersection to the intersection's coverage access point to a second distance from a second coverage access point wherein the intersection's coverage access point and the second coverage access point have the same frequency assignment.

16. The method of claim 12 wherein the step of determining a shift is performed by considering a number of factors.

17. The method of claim 12 wherein the shifted sequence of frequency channels is negative shifted.

18. A method for backhaul layout for access points in an urban area comprising:

placing coverage access points in a grid of K vertical streets and 2K horizontal streets of the urban area;

at a first vertical street, choosing a first unoccupied intersection within the 2K horizontal streets and placing a first second-tier access point at the intersection;

at a second vertical street within the K vertical streets, choosing a second unoccupied intersection within the 2K horizontal streets and placing a second second-tier access point at the intersection, wherein the chosen second unoccupied intersection is not diagonal to a second-tier access point that was previously placed;

at a third vertical street within the K vertical streets, choosing a third unoccupied intersection within the 2K horizontal streets and placing a third second-tier access point at the intersection, wherein the chosen third unoccupied intersection is not diagonal to a second-tier access point that was previously placed; and iterating through the remaining vertical streets while placing second-tier access points at unoccupied intersections until a base set of K second-tier access points have been chosen, wherein the unoccupied intersections are not diagonal to a second-tier access point that was previously placed.

19. The method of claim 18 wherein the step of placing second-tier access points at unoccupied intersections is represented as a shift of an element of the base set of K second-tier APs by at least one of a) 4Ki blocks horizontally and 4Kj blocks vertically, for some integer pair (i, j) and b) 4Ki+2K blocks horizontally, 4Kj+2K blocks vertically, for some integer pair (i, j).

20. The method of claim 18 further comprising the step of placing first-tier access points at placement that is at least one of a) a close spacing and b) a wide spacing.

* * * * *